United States Patent
Antonucci et al.

(10) Patent No.: US 6,584,307 B1
(45) Date of Patent: Jun. 24, 2003

(54) SYSTEM AND METHOD FOR COMMUNICATING BETWEEN A SPECIAL NUMBER CALL ANSWERING AGENCY AND A MOBILE ACTION ASSET

(75) Inventors: James T. Antonucci, Wheaton, IL (US); Brian Glen Barnier, Naperville, IL (US); David Weksel, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/518,997

(22) Filed: Mar. 3, 2000

Related U.S. Application Data

(63) Continuation-in-part of application No. 09/499,773, filed on Feb. 8, 2000.

(51) Int. Cl.[7] .............................................. H04M 11/00
(52) U.S. Cl. ...................... 455/404; 455/433; 455/445; 455/422; 455/458; 455/461
(58) Field of Search ................................. 455/403, 404, 455/422, 445, 433, 458, 461

(56) References Cited

U.S. PATENT DOCUMENTS

| | | | | |
|---|---|---|---|---|
| 4,757,267 A | | 7/1988 | Riskin | ........................ 379/113 |
| 5,444,760 A | * | 8/1995 | Russ | |
| 5,479,482 A | * | 12/1995 | Grimes | |
| 5,596,625 A | * | 1/1997 | LeBlanc | |
| 5,797,093 A | * | 8/1998 | Houde | |
| 5,890,061 A | * | 3/1999 | Timm et al. | |
| 6,014,556 A | * | 1/2000 | Bhatia et al. | |
| 6,240,285 B1 | * | 5/2001 | Blum et al. | |

* cited by examiner

*Primary Examiner*—Thanh Cong Le
*Assistant Examiner*—Huy Nguyen

(57) ABSTRACT

In a system and method for communicating between a special number call answering agency and a mobile action asset the answering agency answers a special number call placed by a caller. The mobile asset participates in responding to the call. The answering agency and the mobile asset communicate wirelessly. The answering agency recognizes and interprets special number information, including at least one of caller identification and location information. The system comprises: (a) a special number receiving terminal located with the mobile asset and configured to receive and display selected information of the special number information; the receiving terminal being configured to dial back the caller based upon the selected information and (b) a call bridge configured for actuation at the call answering agency to connect the caller with the mobile asset and provide the selected information to the mobile asset when the call bridge is in an actuated orientation.

20 Claims, 8 Drawing Sheets

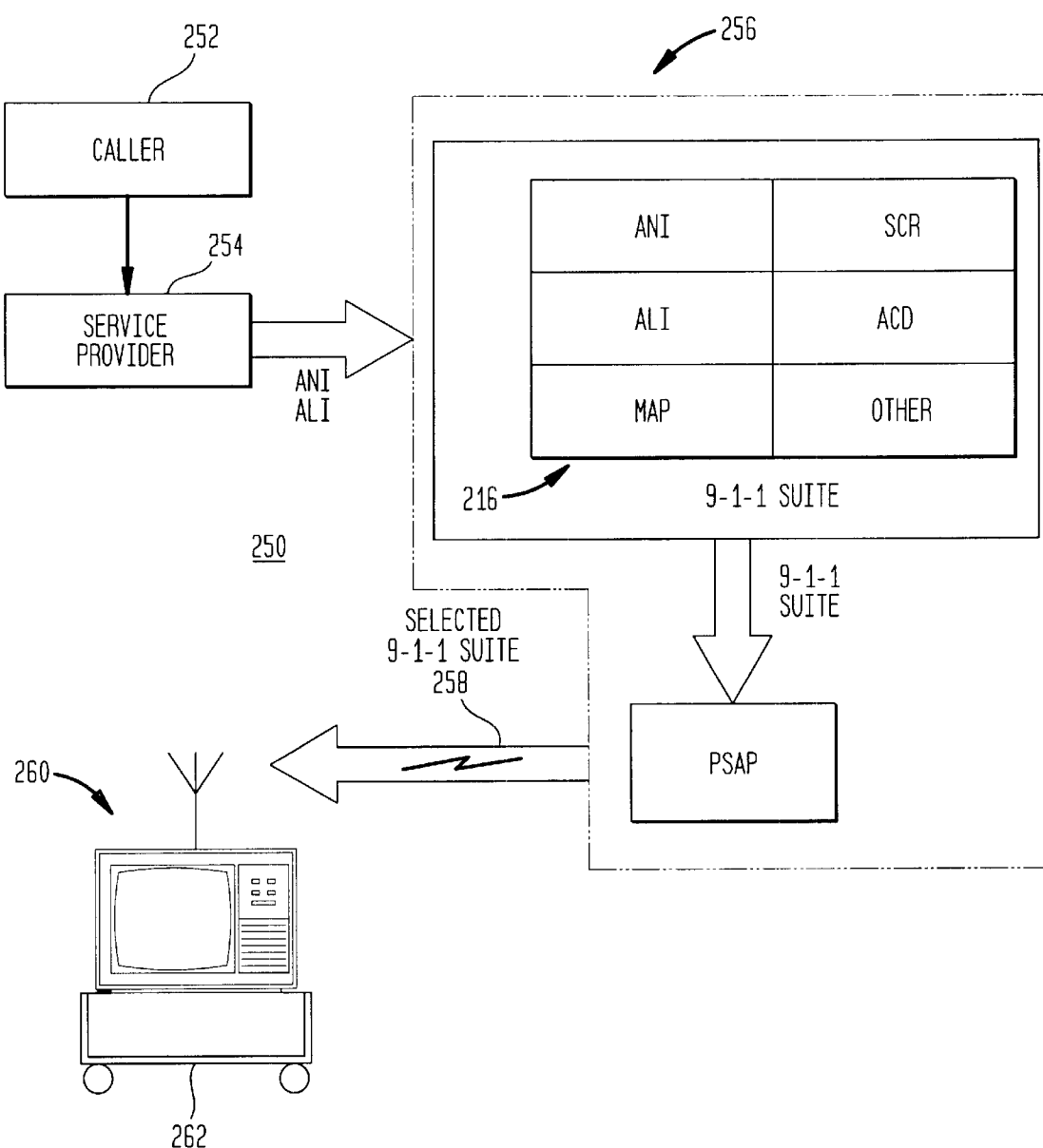

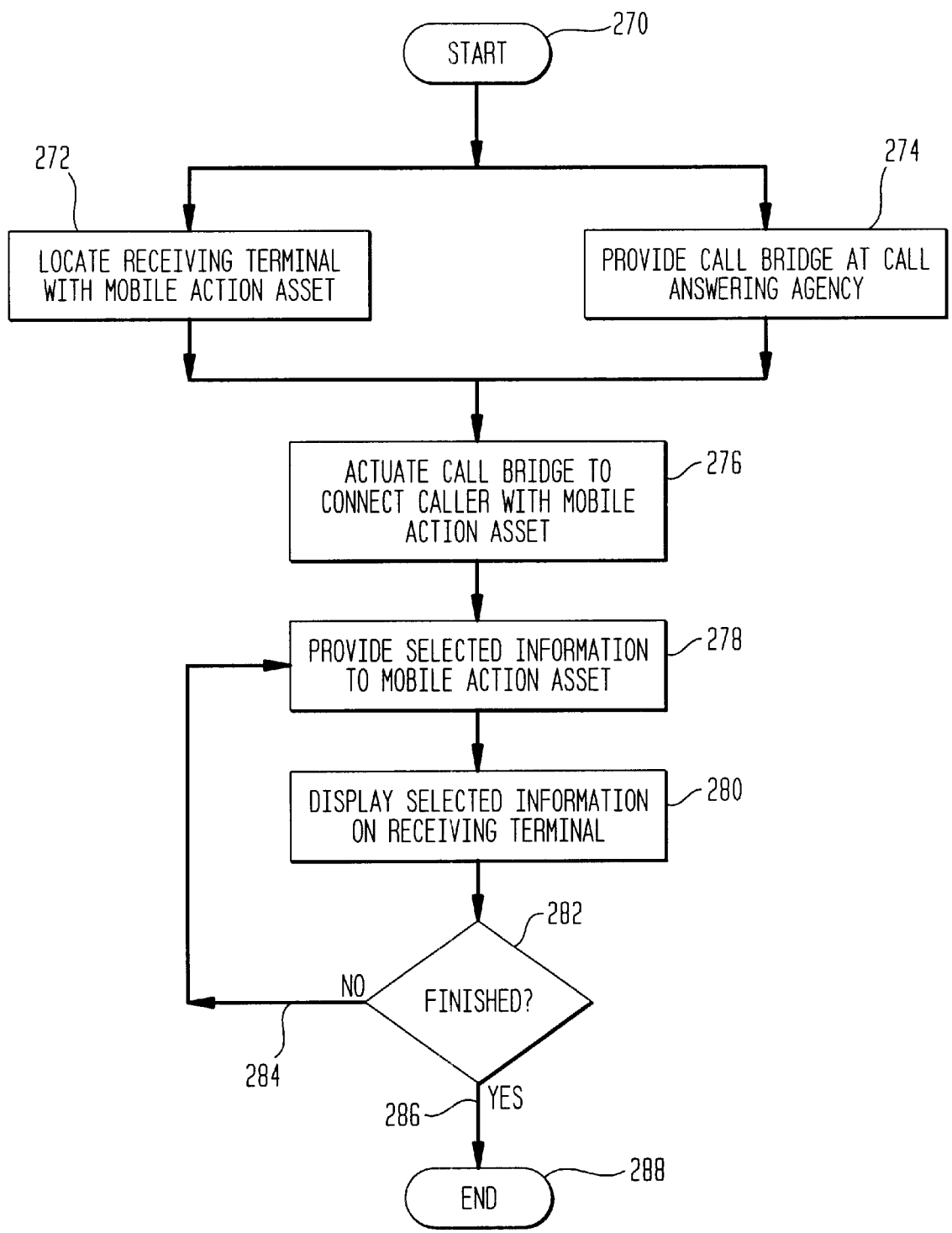

SYSTEM AND METHOD FOR COMMUNICATING BETWEEN A SPECIAL NUMBER CALL ANSWERING AGENCY AND A MOBILE ACTION ASSET

This is a continuation-in-part of application U.S. Ser. No. 09/499,773, filed Feb. 8, 2000.

BACKGROUND OF THE INVENTION

The present invention is directed to telecommunication systems, and especially to telecommunication systems having geographic sensitivity for automatic call connection with receiving stations. The present invention is especially well configured for telecommunication systems dealing with special number telecommunication systems, such as abbreviated number emergency services notification and dispatch operation telecommunication systems. Such emergency services notification and dispatch systems are commonly known as 9-1-1 systems in the United States.

The present invention includes a system and method for enabling any abbreviated number (or other special number) geographically based routing in a manner that is cost effectively applicable to hybrid private/public telecommunication networks such as are found in today's market. Thus, the present invention is advantageous for use by a public telephone service provider (such as an incumbent local exchange company—ILEC), a competitive local exchange carrier (CLEC), an Internet service provider (ISP), a wireless service provider (WSP), a large enterprise customer using a private exchange such as a private branch exchange (PBX), a wireless traffic aggregator/reseller switching between various backbone providers, a satellite telephone service provider or any other telephone service provider that may have users, or customers, employing their service to access a special number service seeking assistance from a geographically proximate locus.

Telecommunication systems sensitive to geographic aspects have been proposed. In U.S. Pat. No. 4,757,267 to Riskin for "Telephone System for Connecting a Customer With a Supplier", issued Jul. 12, 1988, a system is disclosed which contemplates using geographic information gleaned from a caller's telephone number for use with a V-H (vertical-horizontal) data base for ascertaining which site to connect with the caller to ensure geographic proximity between the dealer at the selected site and the caller. The Riskin system depended upon entry of the telephone number information using DTMF (Dual Tone Multi-Frequency) signaling. If a customer entered his phone number using a dial phone, Riskin provided for connecting the caller with a human operator so that the human operator could enter the telephone number information using a DTMF entry device. The V-H data base disclosed by Riskin for use with his system was a complex transformation of latitude and longitude which was used by long distance telephone companies to compute the distance between a caller and a called party in order to assess the charge for a long distance call. Riskin used the V-H coordinate system to refer a caller to a dealer that was determined to be geographically closest to the caller. Riskin also disclosed using the DTMF phone number information to connect a caller with a dealer on a territorial basis to effect "gift routing". According to Riskin's disclosure, a dealer may be connected with a caller based upon the dealer's proximity to an intended gift recipient who was identified by DTMF phone number information relating to the intended recipient.

Riskin's invention provides only a coarse location based upon the caller's telephone number in the format: "NPA-NNX". In that format, "NPA" refers to "Number Plan Area", commonly known as Area Code. "NNX", the next finer number indicator within an Area Code, refers to a Central Office of the phone service provider. As a result, Riskin's invention provides location only to the detail of an area served by a respective Central Office of a service provider. Such an area can often be a very large geographic expanse. Locating a dense population of service locations regarding proximity to a caller is problematic when the location indicator is coarsely defined, as is the case with Riskin's system.

Emergency services notification and dispatch operations, commonly known in the United States as 9-1-1 Service, has its genesis in a 1957 recommendation by the National Association of Fire Chiefs for a single number for reporting fires. In 1967, the President's Commission on Law Enforcement and Administration of Justice recommended that a single number should be established nationwide for reporting emergency situations. The use of different telephone numbers for different types of emergencies was considered to be contrary to the purpose of using a single, universal emergency notification number. Other federal agencies and several government officials supported and encouraged the recommendation. The President's Commission on Civil Disorders charged the Federal Communications Commission (FCC) with finding a solution. In November 1967, the FCC met with the American Telephone and Telegraph Company (AT&T) to establish a universal number that could be implemented quickly. In 1968, AT&T announced the establishment of the number 9-1-1 as the emergency notification number nationwide. The 9-1-1 code was chosen because it was considered to be brief, easily remembered, and could be dialed quickly. It was also a unique number that had never been employed as an office code, area code or service code, and it met long range numbering plans and switching configurations of the telecommunication industry. The 9-1-1 number met the requirements of all parties, in government and in private industry.

Congress supported the AT&T plan and passed legislation allowing use of only the numbers 9-1-1 when creating an emergency calling service. The 9-1-1 number was thus established as a nationwide standard emergency number. The first 9-1-1 call in the United States was completed by Senator Rankin Fite in Haleyville, Ala., using the Alabama Telephone Company. Nome, Ak. Implemented 9-1-1 service in February 1968.

In 1973, The White House Office of Telecommunication issued a policy statement recognizing the benefits of 9-1-1, encouraging the nationwide adoption of 9-1-1, and establishing a Federal Information Center to assist governmental units in planning and implementing 9-1-1 service.

A basic 9-1-1 System provides for programming with special 9-1-1 software a telephone company end office (also known as a "central office" or a "Class 5 office") to route all 9-1-1 calls to a single destination. The single destination was termed a Public Safety Answering Point (PSAP). In such an arrangement, all telephones served by the central office would have their 9-1-1 calls completed to the PSAP. However, the areas served by respective telephone company central offices do not line up with the political jurisdictions that determine the boundaries for which PSAP may be responsible. That is, a municipal fire department or police department may geographically include an area outside the area served by the central office, a condition known as underlap. Likewise, the municipal fire or police department may encompass an area of responsibility that is less expansive than the area served by the central office, a situation known as overlap. Further, the original basic 9-1-1 systems did not provide any identification of the caller; the PSAP human operator had to obtain such information verbally over the line after the call was connected. The major shortcoming of the basic 9-1-1 systems was that they could not support interconnection to other telecommunication providers such as independent telephone service companies, alternate local exchange carriers (ALECs), or wireless carriers. The "basic" nature of the basic 9-1-1 system also indicates that the system does not have Automatic Location Identification (ALI) capability or Automatic Number Identification (ANI) capability with a call back capability.

Similar abbreviated number systems are in place for handling emergency service calls in countries other than the United States. The abbreviated number system established in Canada is the foreign system most similar to the system established in the United States. There are other abbreviated number calling systems in place in the United States and abroad for such purposes as handling municipal information and services calls (3-1-1) and for other purposes. All of these special, or abbreviated number call systems that have geographic-based content suffer from similar shortcomings in their abilities to automatically place incoming calls to an action-response facility geographically proximate to the locus of the caller. It is for this reason that the 9-1-1 emergency call system of the United States is employed for purposes of this application as a preferred embodiment of the system and method of the present invention.

Automatic Number Identification (ANI) is a feature for 9-1-1 services that allows the caller's telephone number to be delivered with the call and displayed at the PSAP. This ANI feature is sometimes referred to as Calling Party Number (CPN). The feature is useful for identifying the caller and, if the caller cannot communicate, for callback. A signaling scheme known as Centralized Automatic Message Accounting (CAMA), originally used to identify the originator of a long distance call for billing purposes, was adapted to facilitate ANI delivery to the PSAP. CAMA uses multi-frequency (MF) signaling to deliver 8 digits to the PSAP. The first digit (called the Number Plan Digit-NPD) specifies one of four possible area codes. Digits 2–8 represent the caller's 7-digit telephone number. The ANI is framed with a key pulse (KP) at the beginning and a start (ST) at the end in the format: KP-NPD-NXX-XXXX-ST.

The multi-frequency (MF) signaling used in connection with the ANI feature is not the same as the Dual Tone Multi-Frequency (DTMF) signaling also encountered in telecommunication systems. Both signaling schemes use a combination of two specific tones to represent a character, or digit, but the tones are different. There are 16 DTMF tones (0–9, #, *, A, B, C, D); there are a greater number of MF tones (including 0–9, KP, ST, ST', ST", and others). DTMF tones represent signals from a user to a network; MF tones are control signals within the network. An enhanced MF arrangement has recently been used in connection with 10-digit wireless telephone systems.

The availability of the caller's telephone number to the PSAP (the ANI feature) led quickly to providing the caller's name and address as well. This was straightforwardly accomplished using the subscriber information stored by telephone companies based upon telephone number since the 1980's. New equipment at the PSAP enabled queries of an Automatic Location Identification (ALI) data base using the caller's number provided by the ANI feature to ascertain name and address information. The ALI databases are typically maintained by the respective telephone company serving the PSAP. This was an improvement, but a problem still remained where several telephone company central offices served a town or county. Other problems also developed with the growing volume of mobile callers using wireless phones, satellite phones and communications over the Internet. Information regarding the locus of the origin of the call merely identified the locus where the call entered the wireline network; even such limited location information is not always provided. No indication was presented to identify the geographic location of such mobile callers.

As the situation of multiple central offices serving a PSAP occurred more frequently, it was clear that it was inefficient to build communication trunks from several central offices to a PSAP. As a result the 9-1-1 Tandem was developed. With that equipment, trunks from central offices are concentrated at a tandem office (a 9-1-1 Tandem) from which a single trunk group serves a given PSAP. Often a 9-1-1 tandem comprises an otherwise common Class 5 telephone system end office (EO), with added software to configure it for 9-1-1 operations. Such concentration of trunks reduces size and cost of PSAP equipment. The tandem is a telephone company switch that provides an intermediate concentration and switching point. Tandems are used for many purposes, including intra-LATA (Local Access and Transport Area) toll calls, access to other local exchange carriers (LECs), and access to long distance carriers and telephone operators.

A significant development in 9-1-1 services has been the introduction of Enhanced 9-1-1 (E9-1-1). Some of the features of E9-1-1 include Selective Routing, ANI, ALI, Selective Transfer and Fixed Transfer. Selective Transfer enables one-button transfer capability to Police, Fire and EMS (Emergency Medical Service) agencies appropriate for the caller's location listed on the ALI display. Fixed Transfer is analogous to speed dialing.

Selective Routing is a process by which 9-1-1 calls are delivered to a specific PSAP based upon the street address of the caller. Selective Routing Tandems do not directly use address information from the ALI database to execute decisions regarding which PSAP to connect. Recall that emergency services (Police, Fire and EMS) are typically delivered on a municipality basis. Often there will be one Police Department (e.g., municipal, county or state), but there may be several Fire Departments and EMS Agencies. The town will be divided into response areas served by each respective agency. The response areas are overlaid and may be defined as geographic zones served by one particular combination of Police, Fire and EMS agencies. Such zones are referred to as Emergency Service Zones (ESZ). Each ESZ contains the street addresses served by each type of responder. The ESZs are each assigned an identification number (usually 3–5 digits), known as Emergency Service numbers (ESN).

The Assignment of ESZs and corresponding ESNs enables the compilation of selective routing tables. The street addresses are derived from a Master Street Address Guide (MSAG), a data base of street names and house number ranges within associated communities defining Emergency Service Zones (ESZs) and their associated Emergency Service Numbers (ESNs). This MSAG enables proper routing of 9-1-1 calls by the 9-1-1 tandem; this is Selective Routing as implemented in a 9-1-1 system. Thus, the telephone company must have an MSAG valid address to be assigned the appropriate ESN for selective routing purposes and that information must be added to the 9-1-1 ALI database. It is by using such information that the selective routing capability of the Selective Routing Tandem can properly route a 9-1-1 call to the correct PSAP. If the information is not available in the ALI database, the record is placed into an error file for further manual handling.

A portion of the ALI database may be loaded into a Selective Routing Data Base (SRDB) for use by the 9-1-1 Tandem. The SRDB may be located in the Tandem, in an adjunct processor, or in the ALI database.

Reliability is a very important factor considered in designing 9-1-1 systems. One approach to providing reliability is to provide diversely routed trunk groups from each central office to its respective 9-1-1 Tandem. Preferably, each trunk group is large enough to carry the entire 9-1-1 traffic load for the respective central office. However, some systems are designed with less than full traffic capacity on trunk groups to "choke" or "congestion manage" incoming calls to a tandem in order to avoid overloading a PSAP. In some arrangements, parallel 9-1-1 Tandems are provided so that a central office has capable 9-1-1 Tandem ready for use (albeit with 50% call handling capacity) without interruption if one of the 9-1-1 Tandems fails. Switched bypass to an alternate 9-1-1 Tandem, commonly using digital crossover switches, is another approach to providing reliability in 9-1-1 systems.

Another approach to providing redundancy and robustness for a 9-1-1 system is the employment of Instant Network Backup (INB). Using INB, if a call does not complete to the 9-1-1 network for any reason (e.g., trunk failure, facility problem, 9-1-1 Tandem failure or port failure), the INB takes over and completes the call to a predesignated 7- or 10-digit number. Using this INB alternate path, ANI and ALI information are not delivered, but the call is completed to a local public safety agency, usually the local PSAP.

The interface between Operator handled calls and a 9-1-1 system is addressed in several ways. One system provides a direct connection between an Operator Tandem and the 9-1-1 Tandem. The operator forwards the call with the caller's ANI to the 9-1-1 Tandem. The 9-1-1 Tandem treats the call as though the caller had dialed the call. A second way to effect the desired interface is by using pseudo numbers. A pseudo number is a number that, when dialed, will reach a specific PSAP as a 9-1-1 call. Pseudo numbers have some special ALI information associated with them; for example, there may be a pseudo number associated with each municipality in a state. Dialing the pseudo number, usually from outside the LATA (Local Access and Transport Area), will generate a 9-1-1 to the PSAP for that municipality. The ALI display will indicate that it is a third party conference call from an unknown address in that town. The caller is not identified, but the call goes to the PSAP where the caller is believed, or claims, to be. Pseudo numbers are useful for Alternate Local Exchange Carrier (ALEC) or Competitive Local Exchange Carrier (CLEC) operators who may be located anywhere in the country.

A third method for effecting an interface for operator handled calls with a 9-1-1 system is through the public switched telephone network (PSTN), dialing the directory number for the PSAP. This is often referred to as the "back door" number by ALEC and CLEC operators.

The same issues encountered in implementing a 9-1-1 system for identifying user location are also extant in other telecommunication systems where user location (or other locations) are important. As mentioned above in connection with the Riskin '267 Patent, marketing decisions, dealer contact actions and delivery actions may be more informedly effected using location information obtainable from a properly featured telecommunication system. According to Riskin, such geographic location information is of value even when it is coarse information suitable only for locating a caller within a telephone service provider central office service area.

The advent of wireless communications has further exacerbated the difficulty of ascertaining caller location in telecommunication systems. The "patchwork" solutions described above regarding 9-1-1 systems have been mirrored in other special, or abbreviated number systems to a significant extent. The "patchwork" solutions have created a capability-limited telecommunication system that cannot ascertain geographic information as fully or as easily as it should for all types of callers. This capability limitation has been especially felt in connection with wireless telephone systems. The system is overly dependent upon human intervention to properly route calls to appropriate receivers, such as a proper PSAP. New modes of communication, such as Voice Over IP (Internet Protocol), further contribute to telecommunication traffic not identifiable regarding geographic origin using present telecommunication routing systems.

Similar limitations will likely occur in other abbreviated number, or other special number, telephone systems handling location-based calls with resulting adverse limitations. Other such abbreviated number systems include emergency call systems in countries other than the United States, abbreviated number calling systems for reaching telephone maintenance services, abbreviated number calling systems for municipal information and services, and similar systems.

There is a need for an improved telecommunication system and method with geographic sensitivity that can be employed for abbreviated number systems and other telephone systems to ascertain user location or other geographic information with less human intervention than is presently required.

There is also a need for an improved telecommunication system and method with geographic sensitivity that can be employed for abbreviated number systems and other telephone systems to ascertain user location or other geographic information when involving wireless, Internet, satellite or other non-geographically fixed communication technologies.

SUMMARY OF THE INVENTION

A system for communicating between a special number call answering agency and a mobile action asset is disclosed. The special number call answering agency answers a special number call placed by a caller. The mobile action asset participates in responding to the special number call. The special number call answering agency and the mobile action asset are configured to communicate wirelessly. The special number answering agency is configured to recognize and interpret special number information, including at least one of identification information and location information relating to the caller. The system comprises: (a) a special number receiving terminal located with said mobile action asset; said special number receiving terminal being configured to receive and display selected information of said special number information; said special number receiving terminal being configured to dial back said caller based upon said selected information; and (b) a special number call bridge; the special number call bridge is configured for actuation at the special number call answering agency. The special number call bridge connects the caller with the mobile action asset and provides selected information of the special number information to the mobile action asset when the special number call bridge is in an actuated orientation.

The method of the present invention comprises the steps of: (a) in no particular order: (1) locating a special number receiving terminal with the mobile action asset; the special number receiving terminal being configured to receive selected information of the special number information; and (2) providing a special number call bridge; the special number call bridge being configured for actuation at the special number call answering agency; (b) orienting the special number call bridge in an actuated orientation to connect the caller with the mobile action asset; and (c) providing selected information of the special number information to the mobile action asset. The method may comprise the further step of: (d) displaying the selected information using the mobile computer device. Preferably the special number receiving terminal is a professional mobile radio (PMR), as that term is understood in the art and defined by regulatory and industry usage, such as the Federal Communications Commission (FCC). However, any computer/receiver having capabilities substantially similar to the capabilities of a PMR will fall within the purview of the claimed invention.

Prior art special number, or abbreviated number telecommunication systems receive some geographic related information. In some presently existing situations, mostly involving wireline telephone connections, geographic information received is adequate to accomplish required routing. In other presently existing situations, such as in situations requiring rerouting of calls to wireless service providers (WSP), to private branch exchanges (PBX), to overcome a problem in the normal wireline connection, or for other special situations, required call routing is difficult. The degree of difficulty varies depending upon whether adequate arrangements were made beforehand between respective PSAPs. In such difficult rerouting situations, human operators at special number answering stations must effect connection with geographically appropriate special number action stations in order that appropriate action agencies geographically proximate to the caller initiating the special number call may be responsively employed. In some systems the human operator effects the required routing by pressing a button, or a plurality of buttons. However, in order to ascertain the desired destination of the call, the human operator must read a screen or consult a list or directory. Such consulting to ascertain desired routing decisions consume time and offer opportunities for human errors.

There is a need for an automatic-connection capability for effecting the desired geographically proximate call completion with little or no human operator intervention required. Automatic routing based upon geographic information provided with call information is known for generalized telephone network systems. There is a need for employing the advantages proven to be attainable by today's generalized telephone network systems technology to the 1960's and 1970's "patchwork" system structure presently employed for special number communication systems in the United States.

The special number handling and routing system of the present invention offers numerous advantages over present special number systems. The present invention contemplates adding special number handling capabilities to a telecommunication network switch, such as selective routing, enhanced Automatic Location Identification (ALI), mapping, and other capabilities peculiarly applicable to special, or abbreviated number call handling. Such added capabilities at the special number system network switch level provide significant flexibility to handling of special number calls by a telecommunication system. For example, such integration of special number call handling capability in a telephone network obviates the need for choking through overflow routing, queuing, interactive voice response (IVR) or granular plotting of calls for filtering. The new system of the present invention minimizes the difficulty in coordinating choking across a variety of Local Exchange Carriers (LECs) that may route calls to a 9-1-1 tandem. The new system provides each carrier (LEC) with an appropriately engineered network access to manage call volume and distribute calls to call takers in special call answering stations, such as Public Safety Answering Positions (PSAPs), or route the calls to queues or IVRs, according to extant service policies.

Another important capability provided by the system of the present invention is an ability to manage multiple special number answering stations (such as PSAPs) for disaster recovery, mutual aid, or other cooperative activities. The system of the present invention facilitates sharing of data screens, call screens, dispatch screens and other commonalities that may be instituted when needed without necessarily requiring voice connection. The system of the present invention also creates a more robust system better able to resist interruption during disaster operations. Integrating special number handling systems with a telecommunication system at the special number system network switch level provides significantly greater flexibility and speed in traffic rerouting to avoid network breaks, and similar disaster-related problems.

Also of significance, such high-level integration of special number handling systems with public telecommunication systems makes it more likely that improvements and advances in communication technology will be employed for upgrading special number handling in the future. If special number handling systems are not "main stream" applications integrated within the public phone system, there may be a tendency for them to evolve differently than the public telephone system, and future compatibility between systems would be ever more difficult.

Further, high level integration of special number call handling capabilities within the main stream public telephone network facilitates easier inclusion of diverse special call handling agencies within the system, such as colleges, animal control agencies, poison control agencies and others.

By way of example, from a public safety perspective, two significant improvements provided by the system of the present invention are (1) interconnected PSAPs with click-through routing enabling that treats all PSAPs as one large logical PSAP across political jurisdictions and carrier service providers' boundaries; and (2) a significantly more reliable network with added redundancy, ability for calls to overflow and be backed up (e.g., eliminating choking) and enhanced network management capabilities using the latest technologies. These advantages are realized because the system of the present invention employs 9-1-1-tandems interconnected with all other 9-1-1 tandems and network switches at high level interfaces enabling more varied data types at faster speeds in the public telephone network. In its preferred embodiment, a 9-1-1 tandem configured according to the present invention is a stand-alone switch apparatus.

It is, therefore, an object of the present invention to provide a telecommunication system and method for handling special, or abbreviated number calls that has geographic sensitivity.

It is a further object of the present invention to provide a telecommunication system and method for handling special, or abbreviated number calls that can automatically connect a caller with a geographically proximate action agency with no human intervention using geographic information included with call information.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 7 is a schematic block diagram of an alternate embodiment of a system for communicating between a special number call answering agency and a mobile action asset according to the present invention, manifested in a 9-1-1 system.

FIG. 8 is a schematic flow diagram illustrating the method of the present invention.

DETAILED DESCRIPTION OF THE PREFERRED EMBODIMENT

Figure 1:
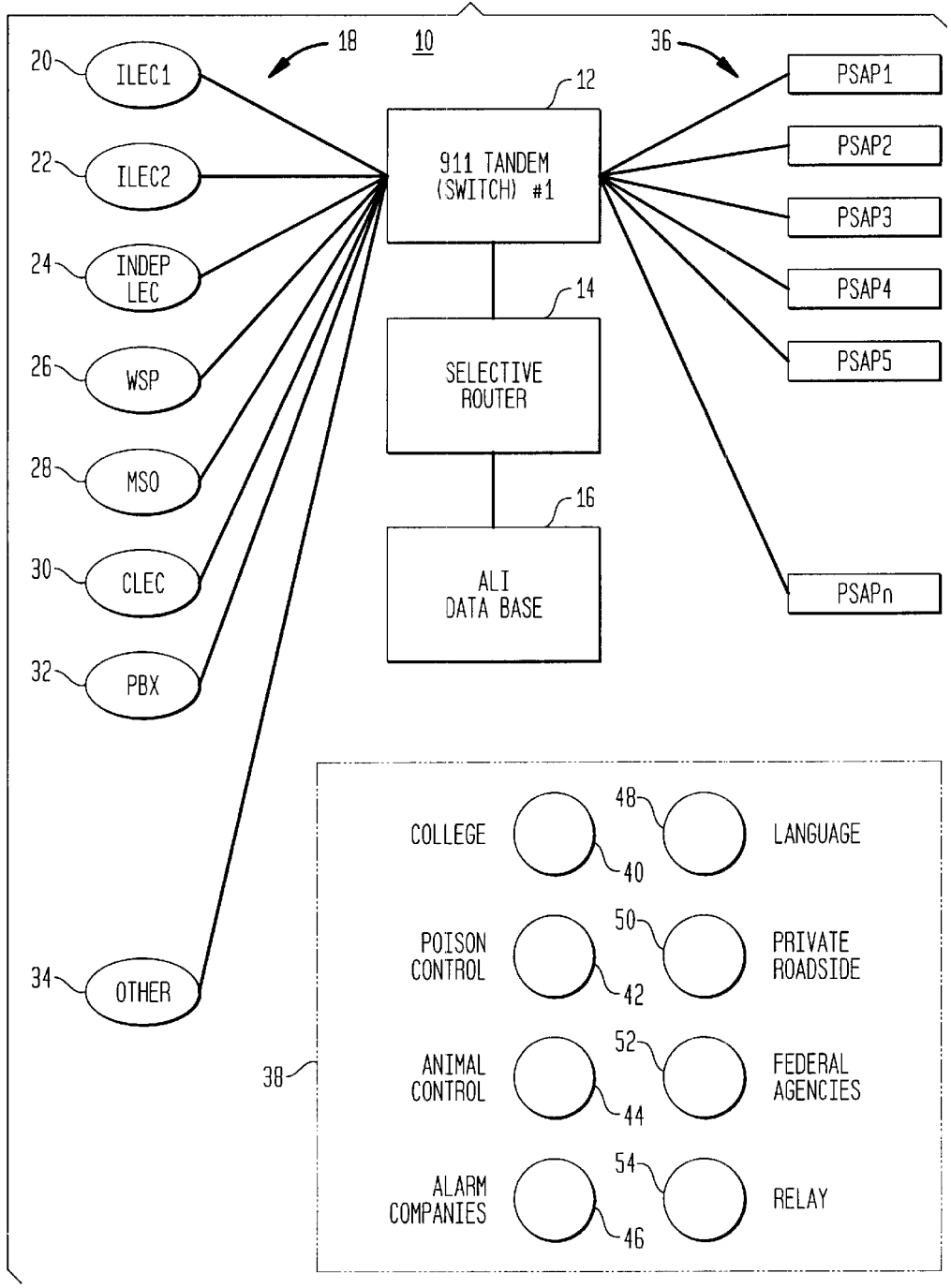
FIG. 1 is a block diagram illustrating selected elements of a prior art abbreviated number telecommunication system manifested in a 9-1-1 system.

FIG. 1 is a block diagram illustrating selected elements of a prior art abbreviated number telecommunication system, manifested in a 9-1-1 system. In FIG. 1, a prior art 9-1-1 telecommunication system 10 includes a 9-1-1 tandem 12 connected with a selective router 14 and an ALI database 16. A plurality of service providers 18 are connected with 9-1-1 tandem 12. Service providers 18 are illustrated in FIG. 1 as representatively including an incumbent local exchange carrier #1 (ILEC1) 20, an incumbent local exchange carrier #2 (ILEC2) 22, an independent local exchange carrier (IndepLEC) 24, a wireless service provider (WSP) 26, a multi-services operator (MSO) 28, a competitive local exchange carrier (CLEC) 30, and a private branch exchange (PBX) 32. Service providers 18 may also include other entities, as represented by a service provider "OTHER" 34 in FIG. 1. Service providers 18 provide telecommunication services to users (not shown in FIG. 1) including, as one communication service, a connection with a 9-1-1 emergency call service. System 10 is representative of a prior art 9-1-1 system in a large metropolitan area having several political jurisdictions. Thus, 9-1-1 tandem 12 serves a plurality of public safety answering positions (PSAPs) 36, such as PSAP1, PSAP2, PSAP3, PSAP4, PSAP5, and PSAPn. The term "PSAP" may also be used to refer to "public safety answering points".

Other emergency call entities 38 are illustrated in FIG. 1 as not connected with 9-1-1 tandem 12. Such entities are typically not included within a 9-1-1 system, yet often may find it advantageous to employ a system such as 9-1-1 system 10. Other entities 38 are representatively (yet, not exhaustively) illustrated in FIG. 1 as including college campuses 40, poison control centers 42, animal control agencies 44, private alarm companies. 46, language translation providers 48, private roadside assistance agencies 50, federal agencies 52 and relay entities 54.

The architecture of prior art 9-1-1 system 10 is centralized primarily around incumbent local exchange carriers (ILECs), such as ILEC1 20 and ILEC2 22, and secondarily around political jurisdictions (not shown in FIG. 1). There are some cooperative agreements in effect, but they are another aspect of the "patchwork" nature of the prior art 9-1-1 systems represented by FIG. 1. The result is that prior art 9-1-1 systems, such as 9-1-1 system 10, are compartmentalized in structure, and cross-jurisdictional cooperation is not easily effected unless a group of jurisdictions—e.g., municipalities within a county—arrange to "hard wire" the connections necessary to accomplish cooperative structure. Sometimes a group of related PSAPs may make other special arrangements with a LEC (Local Exchange Carrier). Interconnection between carriers (i.e., service providers 18 in FIG. 1) or between wireline carriers and wireless carriers are cumbersome. One result is that such ad hoc cooperative system arrangements too often result in a fragile system susceptible to service interruption during disaster situations. It is in such disaster situations that such emergency service systems will be needed most, yet such systems are presently configured in manners lacking robust redundant and diverse route paths to existing 9-1-1 tandems from the service provider offices (e.g., service providers 18 in FIG. 1), or from PSAPs 36 (FIG. 1).

Also of significant importance is the lack of connectivity between other entities 38 and 9-1-1 tandem 12 in prior art system 10. Such a lack of connectivity means that other entities 38 effect connection with a PSAP 36 via the public switched telephone network (PSTN), not shown in FIG. 1, like any other call made between subscribers.

Another significant shortcoming of prior art 9-1-1 system 10 is difficulty in rerouting of calls to an appropriate PSAP 36 geographically proximate to a caller when a PSAP receives a misrouted 9-1-1 call, that is the caller is located not in an area served by the receiving PSAP 36. If a caller reveals his location to a human operator located within system 10 (most likely in association with operation of 9-1-1 tandem 12), the human operator can manually reroute the call to connect the call to a PSAP 36 most proximate to the caller's location. Selective router 14 identifies which PSAP is appropriate for handling a particular emergency based upon location information regarding the caller. Using information from selective router 14, a human operator may effect connection with the indicated appropriate PSAP; selective router 14 does not have a straightforward robust rerouting capability as is contemplated by the present invention. Selective router 14 may present a display on a screen to a human operator for selecting an appropriate PSAP for the call being considered. The human operator selects a PSAP from the display on the screen and presses a button to complete the call. In essence, the call completion is effected as a conference call. Such a call destination selection and completion arrangement is fraught with opportunities for human error, and ties up communication resources unnecessarily.

ALI database 16 is just that—a data base. ALI database 16 cooperates with selective router 14 to facilitate the identification of an appropriate PSAP by selective router 14. However, no straightforward robust rerouting of calls to PSAPs proximate to a caller's locus is effected using ALI data base 16, selective router 14, or any combination of those devices.

Figure 2:
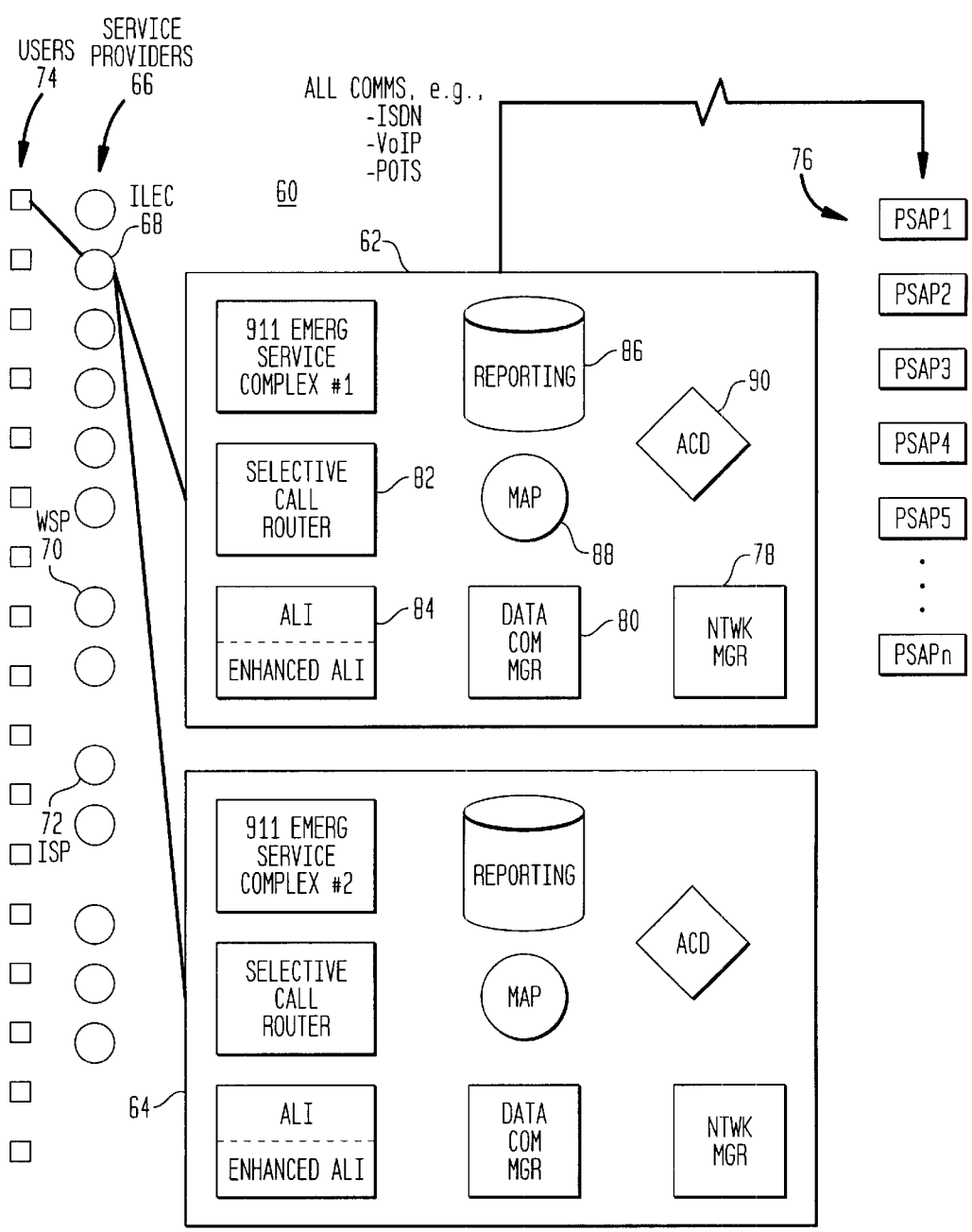
FIG. 2 is a block diagram illustrating selected elements of the preferred embodiment of the abbreviated number telecommunication system of the present invention, manifested in a 9-1-1 system.

FIG. 2 is a block diagram illustrating selected elements of the preferred embodiment of the abbreviated number telecommunication system of the present invention, manifested in a 9-1-1 system. In FIG. 2, an improved 9-1-1 system 60 includes a first emergency service complex (ESC1) 62 and a second emergency service complex (ESC2) 64. Preferably emergency service complexes ESC1 62 and ESC2 64 are substantially the same in structure and are arranged for parallel backup operational support for users of improved system 60. In order to simplify explanation of improved system 60, this description will focus upon connections and arrangements involving emergency service complex ESC1 62, with the understanding that parallel connections and arrangements are in place regarding emergency service complex ESC2 64.

Emergency service complex ESC1 62 serves a plurality of service providers 66. As will be appreciated in greater detail in connection with FIG. 4, emergency service complex ESC1 62 is connected via a public telecommunication network (not shown in FIG. 2) with a significantly wider range of service providers 66 than were served by prior art 9-1-1 system 10 (FIG. 1). Thus, emergency service complex ESC1 62 serves service providers 66 including an incumbent local exchange carrier (ILEC) 68, a wireless service provider (WSP) 70, an Internet service provider (ISP) 72, and other service providers 66 not specifically identified in FIG. 2. In fact, emergency service complex ESC1 62 may be connected via a public network, such as a public switched telephone network (PSTN) (not shown in FIG. 2) with any of the service providers 18 (FIG. 1), with any or all of the other entities 38 (FIG. 1), and with additional service providers not even contemplated for connection with prior art 9-1-1 system 10. Such additional service providers may include, by way of example, Internet service provider ISP 72 (FIG. 2).

Service providers 66 provide telecommunication services of various milieux to callers, or users 74. The various telecommunication milieux contemplated by system 60 of the present invention includes any electronic transmission of information including, for example, voice, data and video communications, whether delivered via systems employing digital, analog, ISDN, optical, wireline, wireless, or other delivery technologies. Also included within the contemplated technological applicability of the present invention are voice, data or video signals delivered over the Internet, via satellite communications, or via other delivery media.

A similarly broad array of communication milieux are also available to connect emergency service complex ESC1 62 with a plurality of public safety answering positions (PSAPs) 76, such as PSAP1, PSAP2, PSAP3, PSAP4, PSAP5, PSAP6, and PSAPn. Similar parallel communication capability is also available between emergency service complex ESC2 64 and service providers 66 and PSAPs 76. The connections relating to emergency service complex ESC2 64 are not fully displayed in FIG. 2 in order to keep the drawing simple for purposes of explaining the present invention.

Emergency service complex ESC1 62 is configured much like a digital switching node in a public telecommunication network to include a network manager device 78 and a data communication manager device 80. Improved system 60 further includes a selective call router 82 and an ALI/enhanced ALI data base 84. Network manager device 78, data communication manager device 80 and selective call router 82 cooperate to effect location-based call routing, monitor system maintenance needs and carry out other administrative functions. ALI/enhanced ALI data base 84 is substantially similar to such data bases used in present enhanced 9-1-1 systems, and provides additional information relating to callers using the 9-1-1 system, such as special medical needs, handicaps, medication needs and similar information that can be provided by subscribers, or callers, for use in case of an emergency.

Preferably emergency service complex ESC1 62 also includes a reporting data base and utility 86 for ascertaining certain operational characteristics regarding emergency service complex ESC1 62 and improved system 60. For example, reporting data base and utility 86 may be configured to allow managers of improved system 60 to determine how many calls are not reaching an appropriate PSAP 76 within a prescribed time, whether changes in routing criteria might be useful in balancing loads on PSAPs 76, and similar information.

A preferred embodiment of emergency service complex ESC1 62 further includes a mapping capability 88 capable of interpreting geographical information received relating to callers and displaying an indication of such geographic information on a map at emergency service complex ESC1 62, selected PSAPs 76 or elsewhere as an aid to human operators or others. A preferred embodiment of emergency service complex ESC1 62 also includes an automatic call distributor(ACD) 90. ACD 90 effects routing of calls to appropriate PSAPs 76 based upon information provided by selective call router 82. It must be emphasized here that selective call router 14 of prior art system 10 (FIG. 1) relates only street address information with PSAPs, and is not configured for or capable of comprehensive global geographic location determination as is contemplated with the present invention. The configuration of emergency service complex ESC1 62 with a telecommunication switch capability appropriate for operation within a PSTN (including virtual private networks, private networks and other limited access network configurations) as a "full participant" station operating as a telecommunication system node, as contemplated by the present invention, means that selective router 82 of improved system 60 may identify and effect routing to any PSAP reachable by the PSTN.

The present invention contemplates improved system 60 being configured for full participation in a global telecommunication network (not shown in FIG. 2) as a substantially fully cognizant telecommunication switching capability. As a consequence of the fully capable network configuration of the present invention, improved system 60 can receive calls from any user connected with a global telecommunication network through service providers connected to the global network. Thus, geographic information relating to callers' loci will be received relating to a plurality of communication milieux: plain old telephone system (POTS), wireless telephones, satellite telephones, Internet connections, and data delivered by any of those conveyances. Being connected with the global network as a fully capable entity, improved system 60 may interpret geographic information received relating to callers' loci on a global basis. Further, because of the global access available to improved system 60 via the global network, connection to PSAPs may be effected worldwide depending upon the geographic information received.

Thus, for example, a caller located in Arizona placing an emergency service call to a private roadside assistance agency situated in Michigan may be serviced by a local action agency (e.g., police, fire, emergency medical service or towing company) because the Michigan roadside assistance agency routed the call to a Michigan emergency service complex (ESC) along with geographic information embedded in call set up data identifying the caller's location in Arizona. The ESC in Michigan can recognize the geographic relevance of the embedded information to route the call (via the global network through its network manager capability) to the appropriate PSAP most proximate to the caller's locus in Arizona.

Such geographic information may indicate location of a switch or service provider (e.g., ILEC, ALEC, WSP) handling the abbreviated number call. The geographic information may be derived from Global Positioning System (GPS) information, or triangulated information from a plurality of wireless service towers to estimate position of a wireless caller. Another type of geographic information may relate to the Internet service provider access point used by the caller to send a message, or any other geographic information appropriate to estimate the locus of the caller placing the abbreviated number call.

The present invention also contemplates that an emergency service complex, such as emergency service complex ESC1 62 (FIG. 2) will have an Internet connected capability. Using such a capability, for example, an operator at emergency service complex ESC1 62 could click on an appropriate button on a tool bar display on a computer screen to effect desired connections, including Internet communications connections. One embodiment of this novel capability is to establish an emergency services "chat window" to facilitate exchange of information between an operator associated with ESC1 62 and a caller accessing the emergency service system via the Internet.

Figure 3:
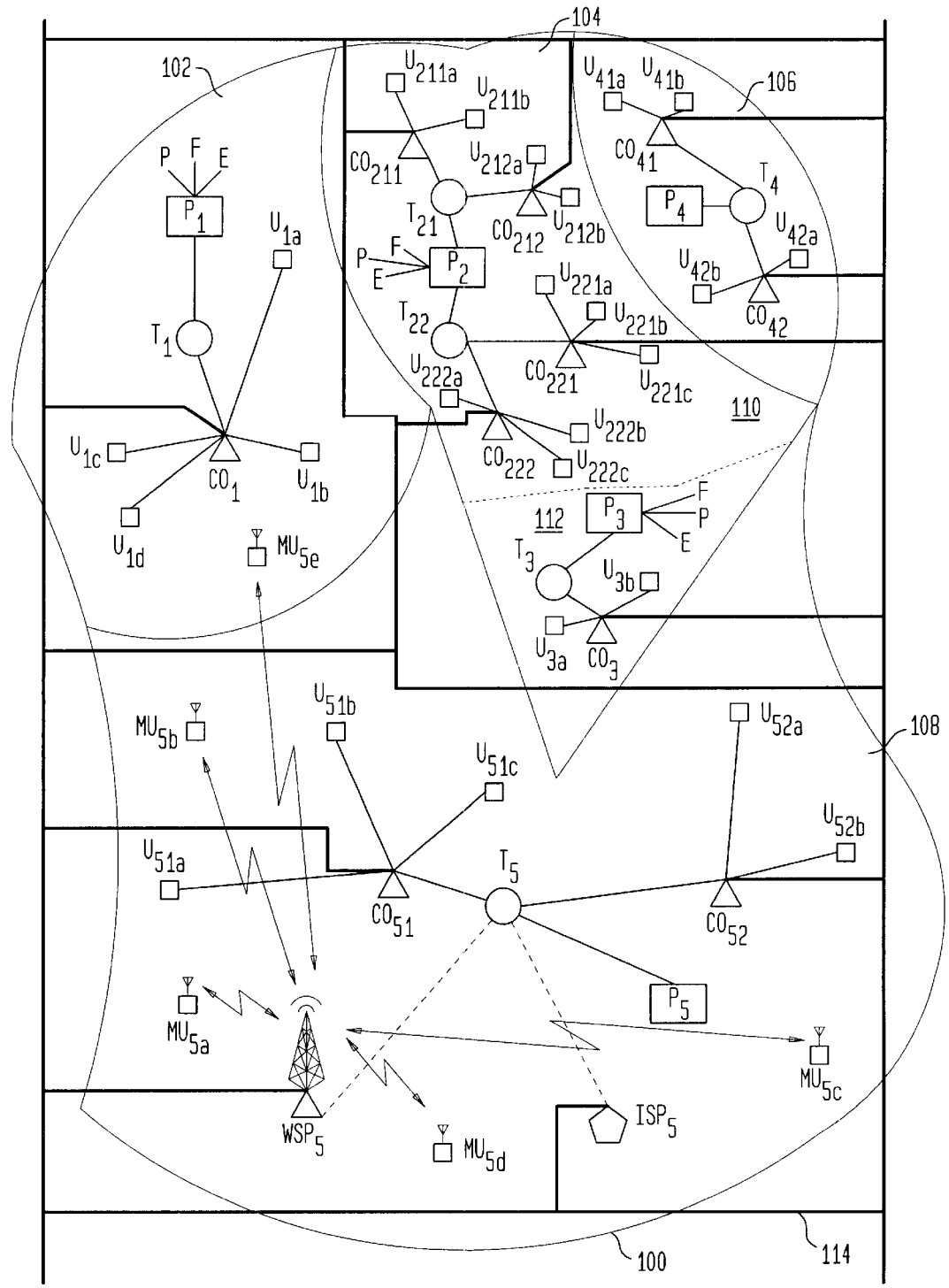
FIG. 3 is a schematic diagram illustrating a prior art employment of an abbreviated number system in a telecommunication network, manifested in a 9-1-1 system.

FIG. 3 is a schematic diagram illustrating a prior art employment of an abbreviated number system in a telecommunication network, manifested in a 9-1-1 system. In FIG. 3, a "country" 100 includes "states" 102, 104, 106, 108. State 104 includes two "counties" 110, 112. Country 100 is served by a telecommunication network 114.

State 102 has an emergency service tandem $T_1$. Tandem $T_1$ is connected with public safety answering position (PSAP) $P_1$; PSAP $P_1$ has communication links with local police (P), fire (F) and emergency medical (E) agencies. Tandem $T_1$ is also connected with central office $CO_1$, the local telephonic service provider for state 102. Central office $CO_1$ supports and is connected with wireline users $U_{1a}$, $U_{1b}$, $U_{1c}$, $U_{1d}$. Central office $CO_1$ is connected with network 114.

State 104 has two counties 110, 112. County 110 has two emergency service tandems $T_{21}$, $T_{22}$, both of which tandems $T_{21}$, $T_{22}$ are connected with a PSAP $P_2$; PSAP $P_2$ has communication links with local police (P), fire (F) and emergency medical (E) agencies. Tandem $T_{21}$ is connected with central offices $CO_{211}$, $CO_{212}$. Central office $CO_{211}$ supports and is connected with wireline users $U_{211a}$, $U_{211b}$. Central Office $CO_{212}$ supports and is connected with wireline users $U_{212a}$, $U_{212b}$. Central offices $CO_{211}$, $CO_{212}$ are each connected with network 114. Tandem $T_{22}$ is connected with central offices $CO_{221}$, $CO_{222}$. Central office $CO_{221}$ supports and is connected with wireline users $U_{221a}$, $U_{221b}$, $U_{221c}$. Central Office $CO_{222}$ supports and is connected with wireline users $U_{222a}$, $U_{222b}$, $U_{222c}$. Central offices $CO_{221}$, $CO_{222}$ are each connected with network 114. County 112 has an emergency service tandem $T_3$ connected with a PSAP $P_3$. Tandem $T_3$ is connected with a central office $CO_3$. Central office $CO_3$ supports and is connected with wireline users $U_{3a}$, $U_{3b}$. Central office $CO_3$ is connected with network 114.

State 106 has an emergency service tandem $T_4$. Tandem $T_4$ is connected with public safety answering position (PSAP) $P_4$; PSAP $P_4$ has communication links with local police (P), fire (F) and emergency medical (E) agencies (not shown in FIG. 3). Tandem $T_4$ is also connected with central offices $CO_{41}$, $CO_{42}$. Central office $CO_{41}$ supports and is connected with wireline users $U_{41a}$, $U_{41b}$. Central office $CO_{42}$ supports and is connected with wireline users $U_{42a}$, $U_{42b}$. Central offices $CO_{41}$, $CO_{42}$ are connected with network 114.

State 108 has an emergency service tandem $T_5$. Tandem $T_5$ is connected with public safety answering position (PSAP) $P_5$; PSAP $P_5$ has communication links with local police (P), fire (F) and emergency medical (E) agencies (not shown in FIG. 3). Tandem $T_5$ is also connected with central offices $CO_{51}$, $CO_{52}$. Central office $CO_{51}$ supports and is connected with wireline users $U_{51a}$, $U_{51b}$, $U_{51c}$. Central office $CO_{52}$ supports and is connected with wireline users $U_{52a}$, $U_{52b}$. Tandem $T_5$ may also be connected with wireless service provider (WSP) $WSP_5$ and Internet service provider (ISP) $ISP_5$. The dotted lines connecting $WSP_5$ and $ISP_5$ with tandem $T_5$ are intended to indicate that such a direct connection is not always established; wireless service providers and Internet service providers often communicate with 9-1-1 systems only via the PSTN. In FIG. 3, wireless service provider $WSP_5$ supports mobile users $MU_{5a}$, $MU_{5b}$, $MU_{5c}$, $MU_{5d}$, $MU_{5e}$. Internet service provider $ISP_5$ supports Internet users (not shown in FIG. 3). Central offices $CO_{51}$, $CO_{52}$ are connected with network 114.

It is important to note in connection with the prior art arrangement illustrated in FIG. 3 the lack of direct connection between any tandem $T_1$, $T_{21}$, $T_{22}$, $T_3$, $T_4$, $T_5$ with network 114. Thus, the only connection of any tandem with network 114 is via a respective central office.

Figure 4:
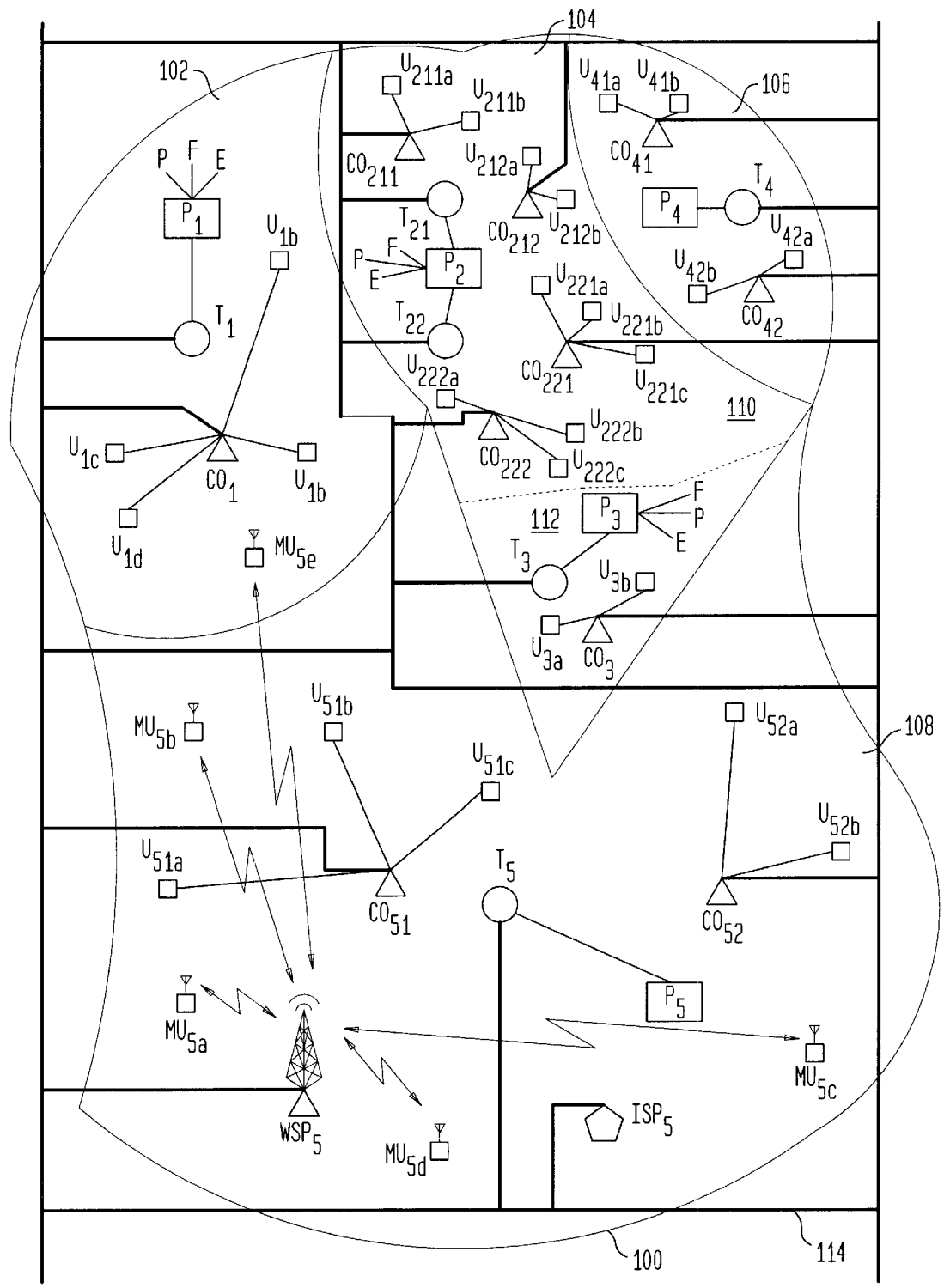
FIG. 4 is a schematic diagram illustrating employment of an abbreviated number system in a telecommunication network, manifested in a 9-1-1 system, according to the present invention.

FIG. 4 is a schematic diagram illustrating employment of an abbreviated number system in a telecommunication network, manifested in a 9-1-1 system, according to the present invention. In the interest of avoiding prolixity and keeping the explanation of the present invention straightforward and simple, a detailed description of FIG. 4 repeating aspects of FIG. 4 that are the same as were illustrated in FIG. 3 will not be undertaken. The tandems, central offices, users, wireless service provider and Internet service provider are all in the same locations and labeled using the same terminology in FIG. 4 as they are in FIG. 3. An important difference in FIG. 4 is that all connections between a tandem and a central office, a wireless service provider, or an Internet service provider have been removed. Also, each tandem is directly connected with network 114. Thus, in state 102, tandem $T_1$ remains connected with PSAP $P_1$, but is not connected with central office $CO_1$. In state 104, Tandem $T_{21}$ remains connected with PSAP $P_2$, but is not connected with central offices $CO_{21}$, $CO_{22}$. Similarly, tandem $T_{22}$ remains connected with PSAP $P_2$, but is not connected with central offices $CO_{221}$, $CO_{222}$. Tandem $T_3$ remains connected with PSAP $P_3$, but is not connected with central office $CO_3$. In state 108, tandem $T_5$ remains connected with PSAP $P_5$, but is not connected with central offices $CO_{51}$, $CO_{52}$, not connected with wireless service provider $WSP_5$, and not connected with Internet service provider $ISP_5$.

In fact, direct connections between tandems and PSAPs are not strictly required by the present invention; all connections with tandems may be effected via a public switched telephone network (PSTN), such as network 114 in FIG. 4. Direct connection with a service provider such as a central office, a wireless service provider or an Internet provider may be established, if desired. However, such direct connections are not required to advantageously employ the structure of the preferred embodiment of the present invention.

All tandems $T_1$, $T_{21}$, $T_{22}$, $T_3$, $T_4$, $T_5$ are connected with network 114. Connection with network 114 is the only connection that any tandem $T_1$, $T_{21}$, $T_{22}$, $T_3$, $T_4$, $T_5$ needs to have with any service provider, with any other tandem, or with any PSAP. Of importance is the fact that connection with network 114 effects connection between each tandem $T_1$, $T_{21}$, $T_{22}$, $T_3$, $T_4$, $T_5$ and any PSAP $P_1$, $P_2$, $P_3$, $P_4$, $P_5$ in state 100.

Providing each tandem $T_1$, $T_{21}$, $T_{22}$, $T_3$, $T_4$, $T_5$ with network switching and management capabilities, as by including selective call router 82, automatic call distributor 90, network manager device 78 and data manager device 80 (FIG. 2), ensures that each tandem $T_1$, $T_{21}$, $T_{22}$, $T_3$, $T_4$, $T_5$ can fully employ geographic information accompanying a call to effect routing of the call to the most proximate PSAP $P_1$, $P_2$, $P_3$, $P_4$, $P_5$ to the caller's locus for providing assistance. Further, the network connection simplifies such routing to a proximate PSAP whatever the communication milieu employed to convey the call; all of the calls eventually are conveyed over network 114 to a tandem $T_1$, $T_{21}$, $T_{22}$, $T_3$, $T_4$, $T_5$, and all calls for dispatching assistance are likewise conveyed over network 114.

The desired pairing of emergency service complexes (ESC) for redundancy in case of disaster can be easily established using known network design and planning techniques, thereby avoiding installation of expensive hard wiring to effect desired parallelism. Further, using network management techniques backup capabilities may be established "on the fly" in case both a primary and a backup ESC are incapacitated. No hard wiring among tandems is necessary to establish redundancy or robustness in the system. All that is required is rerouting of calls within network 114 to create redundancy and back up arrangements, a network management software exercise.

Reference has been made earlier to geographic information accompanying calls. Such geographic information may include routing information within a network identifying the portal at which the call entered the network. For Internet communications (voice or data), the local access number employed to initiate the Internet service may provide a geographic indication of a caller's locus. Global Positioning System (GPS) information, or some other multi-dimensional coordinate locating system, may be employed for locating callers using wireless or satellite communication means. Other sorts of geographic information may as well be employed in connection with practicing the present invention without departing from the spirit of the invention.

Figure 5:
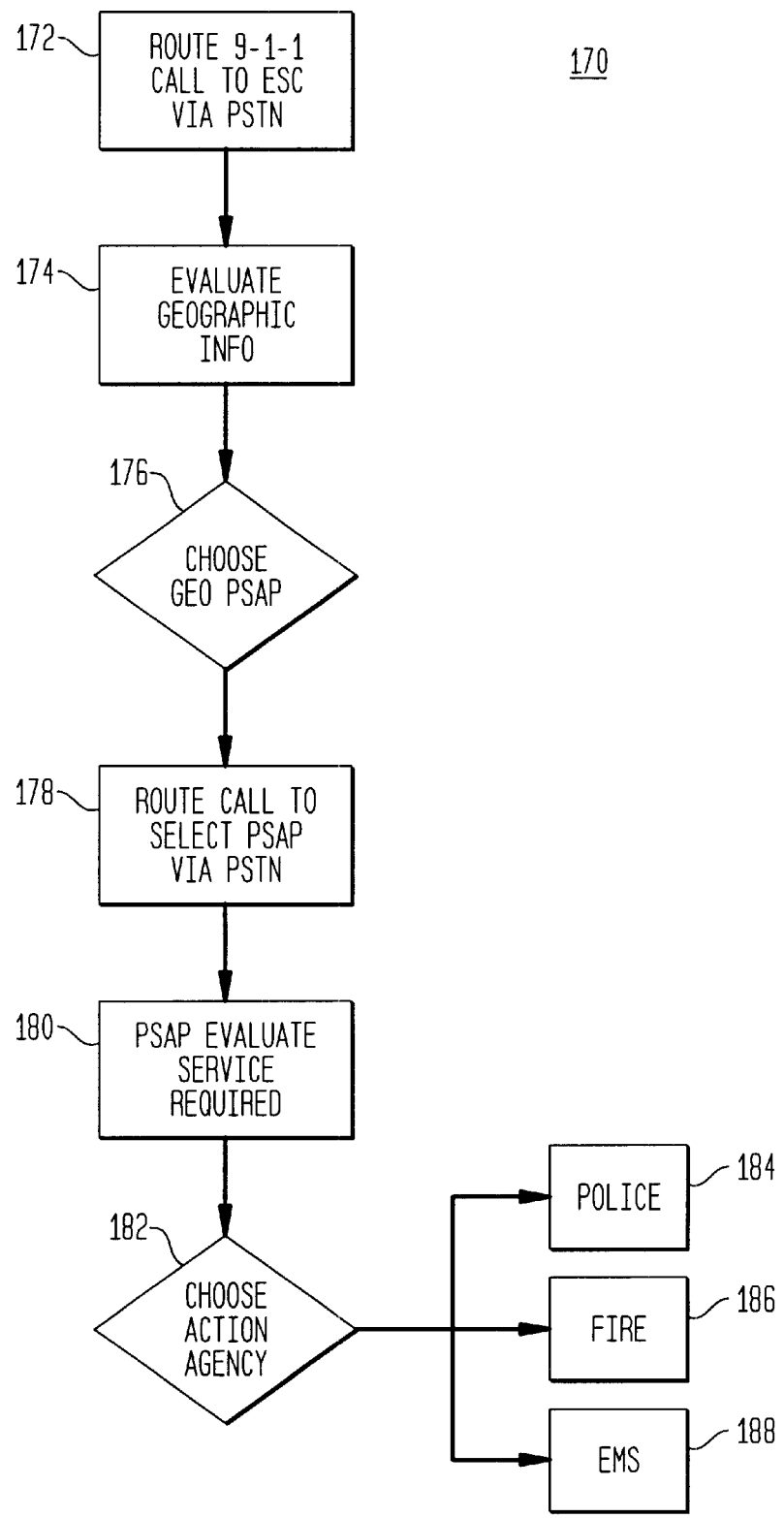
FIG. 5 is a schematic flow diagram illustrating the preferred embodiment of the method of the present invention, manifested in a 9-1-1 system.

FIG. 5 is a schematic flow diagram illustrating the preferred embodiment of the method of the present invention, manifested in a 9-1-1 system. In FIG. 5, the method is intended for use for handling abbreviated calls in a telecommunication network including an array of switches, junctions, communication channels, customer-operated communication devices and telecommunication service providing stations connected to facilitate electronic communication among a plurality of stations using a plurality of communication milieux (not shown in FIG. 5). The method 170 begins with the step of routing the abbreviated number call via the telecommunication network to an abbreviated number call processing center, as indicated by a block 172. The illustrative embodiment employed for explaining the invention in FIG. 5 is a 9-1-1 emergency services call in the United States. Thus, block 172 is labeled to indicate that the abbreviated number call is a 9-1-1 call routed to an emergency service complex (ESC) via a public switched telephone network (PSTN).

The method continues with evaluating geographic information received with the abbreviated number call to ascertain the locus of the caller originating the abbreviated number call, as indicated by a block 174. Such geographic information may indicate location of a switch or service provider (e.g., ILEC, ALEC, WSP, ISP) handling the abbreviated number call. The geographic information may be derived from Global Positioning System (GPS) information, or triangulated information from a plurality of wireless service towers to estimate position of a wireless caller, or any other geographic information appropriate to estimate the locus of the caller placing the abbreviated number call.

The method continues with selecting at least one abbreviated number call answering station (e.g., a public safety answering position—PSAP), as indicated by a block 176. The abbreviated number call is then routed to at least one abbreviated number call answering station, as indicated by a block 178. The at least one abbreviated number call answering station receiving the abbreviated call evaluates the content or nature of the call to ascertain the service required by the caller, as indicated by a block 180. Based upon the evaluation conducted according to block 180, the at least one abbreviated number call answering station chooses an abbreviated number action agency for response to the abbreviated number call, as indicated by a block 182. The selected action agency is notified of the action required by the abbreviated number call, as representatively indicated by a block 184 (in which case the response required may be provided by a police agency), a block 186 (in which case the response required may be provided by a fire agency), and a block 188 (in which case the response required may be provided by an emergency medical service agency).

A further step of the method, not shown in FIG. 5, may involve actually routing the abbreviated number call to the action agency for handling directly with the caller. Even further, the abbreviated number call may be routed to the responding unit dispatched by the action agency to the scene, such as a police patrol car or an ambulance.

As populations grow and community policing becomes more of a point of emphasis, there is a continued and growing necessity for efficient use of police, fire, emergency medical and other responsive assets in the field. This is especially true regarding mobile response assets. There is presently a technological discontinuity in special number response systems, such as emergency service call systems (e.g., 9-1-1 systems). The emergency number telecommunication network (the 9-1-1 network) is presently maintained by telecommunication service providers, such as incumbent local exchange companies (ILECs), or the like. However, the call taking, or responding, aspects of the 9-1-1 system are typically maintained and manned by government agencies. One consequence is that interfaces between the two aspects of the system are not seamless.

For example, information received by a call taking entity, such as a public safety answering position, or point (PSAP), is difficult to efficiently and completely (i.e., including ANI and ALI information) pass to secondary PSAPs that might be highly mobile in nature, such as a community policing station/officer or a park police station/officer responding to an emergency service call. In less sophisticated systems, a human call taker at a PSAP verbally relays information from a caller to the police officer or other responding entity. More sophisticated systems enable a call taker at a PSAP to establish a conference call among the caller, the call taker and the responding person. A significant shortcoming of such an arrangement is that the call taker in the PSAP must stay on the line in the conference call to ensure the robustness of the connection between the caller and the secondary PSAP/field responding entity. In such a conference call situation, the responding person receives no information regarding a call back number (in case the connection is lost or further information is needed after breaking the connection). In fact, most present equipment does not provide for the responding person in the field to call the emergency caller. Of significance also is the fact that the responding person in the field receives no location information other than a verbal description or directions from the PSAP call taker.

There is a need for a system and method for overcoming the technology discontinuity that presently exists between callers and responding field entities, or assets. The present invention provides a system and method that tightly couple the secondary PSAP/field responder's wireless communication equipment with public safety answering positions (PSAPs) seeking to dispatch assets to handle an emergency. The tight coupling enables direct communication between a caller and a responding entity in the field, and direct transfer of data about the caller to the responding entity. The system and method of the present invention are equally applicable and valuable in other special number environments, such as dispatched maintenance services for automobiles, equipment or appliances; dispatched towing services; and other services that send field responsive assets to answer calls placed to a control facility for screening and assignment.

The present invention establishes a communication link that enables a field responder's mobile computer terminal (such as a professional mobile radio—PMR—of the sort used by police personnel) to perform as a secondary PSAP, with full emergency information relating to the incident to which the field responder is responding. The information may be displayed for use by responding personnel in so far as the situation at hand requires. In its preferred embodiment, the responder's equipment can receive, interpret and display information (preferably including text and graphics) relevant to the response situation at hand without a need for voice relay. In its most preferred embodiment, the present invention provides a call bridge to directly connect the caller seeking aid with the responding entity. Thus, by way of example in a 9-1-1-system, pertinent information relating to the situation at hand may include automatic number identification (ANI) information and automatic location information (ALI). The preferred embodiment of the present invention further provides that map information may be provided to, and understood and displayed by, the responder's mobile terminal.

Specifically, the "number" (a unique identifier) of the responder's mobile terminal is preferably transmitted to the PSAP handling the emergency call and dispatching the responding entity from the emergency services network switch/router. This transmission may be accomplished by a wireless telephone system using a wireless service provider (WSP) and associated network connections to the PSAP, or the information may be passed via police radio transmission, or another wireless communication system. The acquisition of a responder's "number" allows a system operator (e.g., the call taker at the PSAP) to populate selective transfer buttons for later use in deciding which responding entity to task with a response. Other arrangements for automatic one button (or a few buttons or keystrokes) actuation to effect transfer of a call may be employed without departing from the present invention.

An emergency caller's location will be known to a call taker (at the PSAP) by any of several means: examples include street address, latitude/longitude coordinates, or x-y coordinates in a grid. When a call taker in a PSAP bridges a call to a secondary PSAP or responding entity in the field (e.g., a patrolling police officer on a bicycle), the responding entity can talk directly with the caller as the responding entity proceeds to the location of the incident. The caller's ANI information may be displayed on a screen for the responding entity so the responding entity, such as a police officer, can call the caller back (e.g., using a redial button) should the call be disconnected. The responding entity's terminal and display screen may be embodied in a personal computer-type device (or another special number receiving terminal, such as such as the aforementioned PMR), or in a palmtop computer device, or in a personal digital assistant (PDA) device. Other portable wireless devices may also be employed to fulfill the element of a mobile terminal without departing from the present invention. The emergency caller's automatic location information (ALI) may also be transmitted to the responding entity.

The responding entity could display ALI information on a screen in the form of x-y coordinates or street address. If a map function is transmitted to the responding party, a map display may be presented on the mobile terminal pinpointing the caller's location.

Figure 6:
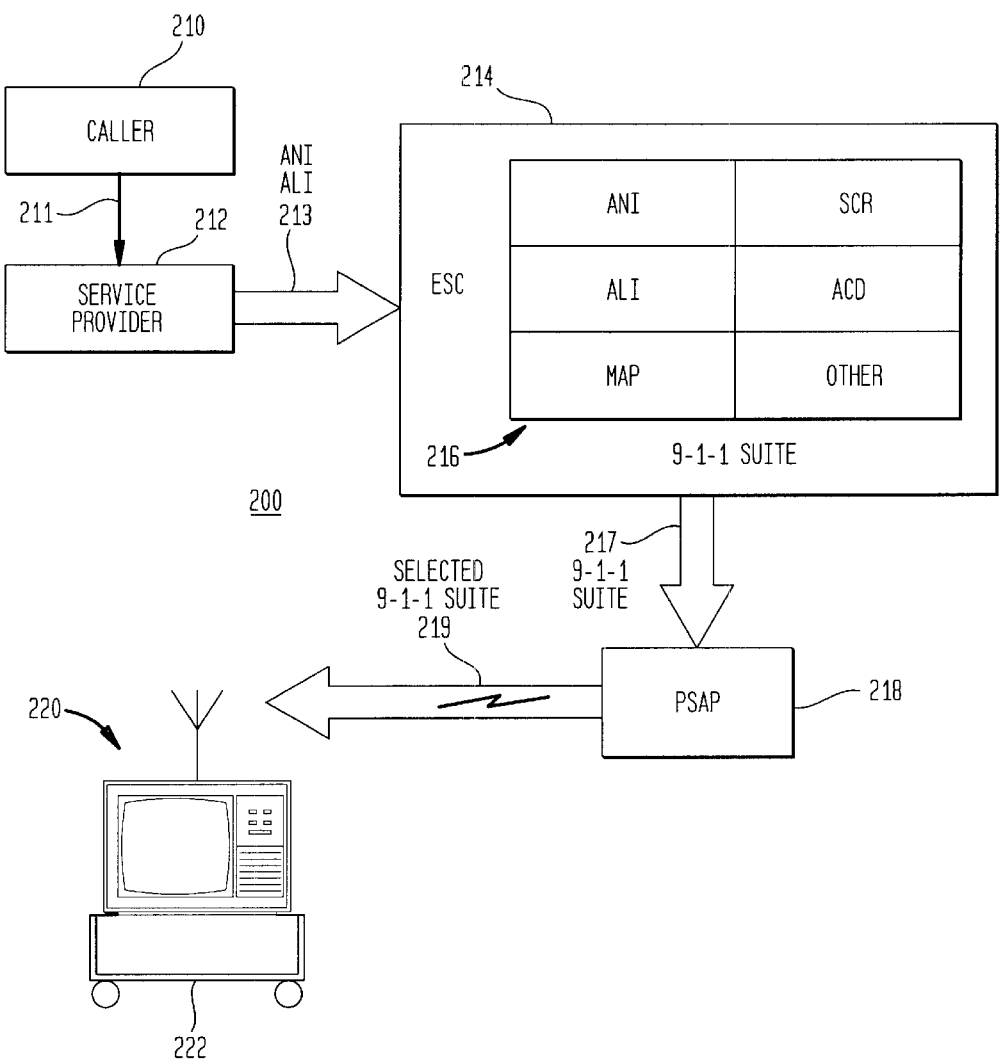
FIG. 6 is a schematic block diagram of the preferred embodiment of a system for communicating between a special number call answering agency and a mobile action asset according to the present invention, manifested in a 9-1-1 system.

FIG. 6 is a schematic block diagram of the preferred embodiment of a system for communicating between a special number call answering agency and a mobile action asset according to the present invention, manifested in a 9-1-1 system. In FIG. 6, an emergency service call system 200 receives an emergency services call from a caller 210. Caller 210 dials an emergency service number, such as 9-1-1, and is connected with a service provider 212. Service provider 212 may be an incumbent local exchange carrier (ILEC), a competitive local exchange carrier (CLEC), a wireless service provider (WSP), an Internet service provider (ISP), or another provider of telecommunication services. Service provider 212 routes the emergency services call to an emergency services complex (ESC) 214. ESC 214 is preferably substantially as described in connection with FIG. 2 hereinabove. In order to avoid prolixity, a full description of ESC 214 will not be repeated here. For purposes of understanding emergency services call system 200 in FIG. 6 it is sufficient to recall that ESC 214 is capable of receiving certain information from service provider 212 that includes automatic number identification (ANI) and automatic location information (ALI). ESC 214 may also have ANI and ALI data stored on line that is received from sources other than accompanying the emergency services call routed from caller 210. Thus, ESC 214 has a 9-1-1 suite of information 216 at hand that identifies pertinent characteristics and facts relating to caller 210. By way of example, 9-1-1 suite 216 may include automatic number identification (ANI) data, automatic location information (ALI) data, mapping data, selective call routing (SCR) data, automatic call distribution (ACD) data and other information in various forms.

The width of arrows communicating among various components of emergency service call system 200 in FIG. 6 is intended to indicate the relative amount of information that is conveyed during such calls. Thus, a caller-to-service provider call 211 conveys relatively little information, usually only information similar to caller identification by phone number. A service provider-to-ESC call 213 may contain relatively more information, such as ANI or ALI data. Alternatively, much of such ANI and ALI data may already be resident at ESC 214, having been obtained beforehand through other sources, as discussed earlier in connection with FIGS. 1 and 2.

An ESC-to-PSAP call 217 conveys significant information relating to the call being handled. ANI data, ALI data, mapping data, information relating to the nature of emergency service required and more may be conveyed from ESC 214 to a PSAP 218. The full array of 9-1-1 suite 216 may be available for conveying to PSAP 218 via ESC-to-PSAP call 217.

In the preferred embodiment of the present invention illustrated in FIG. 6, PSAP 218 communicates wirelessly—as, for example, by wireless telephone or by emergency radio (e.g., a PMR or other hybrid device)—with a mobile asset 220. Mobile asset 220 may be one or more secondary PSAP/emergency response units such as police, fire, emergency medical, disaster recovery or other units. Mobile asset 220 is equipped with a mobile computing device 222. Mobile computing device 222 may be embodied in a professional mobile radio (PMR) terminal, a palm top computer, a personal digital assistant (PDA), a personal computer or any other data handling device capable of wirelessly communicating with PSAP 218, receiving data and displaying data for a responding entity (not shown in FIG. 6) associated with mobile asset 220. Relatively less information conveyed from PSAP 218 to mobile asset 220 in a PSAP-to-mobile asset call 219 than may be received by PSAP 218 from ESC 214. The narrower arrow from PSAP 218 to mobile asset 220 in FIG. 6 is intended to indicate that information conveyed from PSAP 218 to mobile asset 220 is preferably restricted to information relevant to the caller 210 and the emergency situation reported by caller 210. Thus, information in 9-1-1-suite 216 that is pertinent to responding to the emergency reported by caller 210, but not necessarily the entirety of information contained in 9-1-1 suite 216, may be conveyed to mobile asset 220.

FIG. 7 is a schematic block diagram of an alternate embodiment of a system for communicating between a special number call answering agency and a mobile action asset according to the present invention, manifested in a 9-1-1 system. In FIG. 7, an emergency service call system 250 receives an emergency services call from a caller 252. Caller 252 dials an emergency service number, such as 9-1-1, and is connected with a service provider 254. Service provider 254 may be any provider of telecommunication services, as was applicable in the case of service provider 212 (FIG. 6). Service provider 254 routes the emergency services call to a public safety answering station (PSAP) 256. Emergency services call system 250 is illustrated as embodied in a prior art system, as described earlier in connection with FIG. 1. Thus, a service provider-to-PSAP call 255 is routed to PSAP 256 via a 9-1-1 tandem. The requisite 9-1-1 tandem is not illustrated in FIG. 7 in order to simplify the drawing and focus the explanation on the salient aspects of the system as they apply to the present invention. The remainder of emergency services call system 250 operates substantially the same as emergency services call system 200 (FIG. 6). PSAP 256 conveys pertinent information selected as relevant to the situation to which response is required. The selected information from 9-1-1 suite information is conveyed wirelessly via a PSAP-to-mobile asset call 258 to a mobile asset 260 having a mobile computing device 262.

The width of arrows communicating among various components of emergency service call system 250 is intended to indicate the relative amount of information that is conveyed during such calls in the same manner and for the same reasons as have been discussed in connection with FIG. 6. Another discussion of those reasons in connection with emergency services call system 250 (FIG. 7) would be superfluous, and therefore will not be repeated here.

In the alternate embodiment of the present invention illustrated in FIG. 7, PSAP 256 communicates wirelessly—as, for example, by wireless telephone or by emergency radio—with a mobile asset 260. Mobile asset 260 may be one or more secondary PSAP/emergency response units such as police, fire, emergency medical, disaster recovery or other units. Mobile asset 220 is equipped with a mobile computing device 222 that may be embodied in a professional mobile radio (PMR) terminal, a palm top computer, a personal digital assistant (PDA), a personal computer or any other portable data handling device capable of wirelessly communicating with PSAP 256, receiving data and displaying data for a responding entity (not shown in FIG. 7) associated with mobile asset 260.

FIG. 8 is a schematic flow diagram illustrating the method of the present invention. In FIG. 8, a method is illustrated for communicating between a special number call answering agency and a mobile action asset. The special number call answering agency answers a special number call placed by a caller. The mobile action asset includes a mobile computer device and participates in responding to the special number call. The special number call answering agency and the mobile action asset are configured to communicate wirelessly. The special number call answering agency is configured to recognize and interpret special number information, which may, for example, include identification information and location information relating to the caller. The method begins at a "START" box 270 and proceeds to accomplish two things in no particular order: (1) locate with the mobile action asset a special number receiving terminal that is configured to receive selected information of the special number information, as indicated by a block 272, and (2) provide a special number call bridge that is configured for actuation at the special number call answering agency, as indicated by a block 274. The method continues by actuating the special number call bridge to connect the caller with the mobile action asset, as indicated by a block 276. When the caller is connected with the mobile action asset, according to block 276, the selected information may be provided to the mobile action asset, as indicated by a block 278, and displayed on the receiving terminal located with the mobile action asset (according to block 272), as indicated by a block 280. The method proceeds to a decision block 282 to query whether the transaction effected by the caller-to-mobile action asset communication is finished. That is, is the response to the emergency reported by the caller completed? So long as the transaction remains incomplete, the method proceeds via a "NO" response path 284 to return to block 278 and, thence, to block 280 to return to decision block 280. That is, so long as the transaction remains incomplete, the method provides for continued provision of information from the caller to the mobile action asset. When the transaction is complete, the method proceeds from decision block 282 via a "YES" response path 286 to end, as indicated by an "END" block 288.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. A system for communicating between a special number call answering agency and a mobile action asset; said special number call answering agency answering a special number call placed by a caller; said mobile action asset participating in responding to said special number call; said special number call answering agency and said mobile action asset being configured to communicate wirelessly; said special number answering agency being configured to recognize and interpret special number information; said special number information including at least one of identification information and location information relating to said caller; the system comprising:

(a) a special number receiving terminal located with said mobile action asset; said special number receiving terminal being configured to receive and display selected information of said special number information; said special number receiving terminal being configured to dial back said caller based upon said selected information; and (b) a special number call bridge; said special number call bridge being configured for actuation at said special number call answering agency; said special number call bridge connecting said caller with said mobile action asset and providing selected information of said special number information to said mobile action asset when said special number call bridge is in an actuated orientation.

2. A system for communicating between a special number call answering agency and a mobile action asset as recited in claim 1 wherein said selected information includes caller identification information.

3. A system for communicating between a special number call answering agency and a mobile action asset as recited in claim 1 wherein said selected information includes caller location information.

4. A system for communicating between a special number call answering agency and a mobile action asset as recited in claim 3 wherein said selected information includes map information indicating said caller location information.

5. A system for communicating between a special number call answering agency and a mobile action asset as recited in claim 1 wherein said mobile action asset includes a mobile computer device; said mobile computer device being wirelessly communicative with said special number call answering agency.

6. A system for communicating between a special number call answering agency and a mobile action asset as recited in claim 5 wherein said selected information includes caller identification information; said mobile computer device being configured to display said caller identification information.

7. A system for communicating between a special number call answering agency and a mobile action asset as recited in claim 5 wherein said selected information includes caller location information; said mobile computer device being configured to display said caller location information.

8. A system for communicating between a special number call answering agency and a mobile action asset as recited in claim 5 wherein said selected information includes map information indicating said caller location information; said mobile computer device being configured to display said map information.

9. A system for communicating between a special number call answering agency and a mobile action asset as recited in claim 5 wherein said selected information includes caller identification information, and wherein said mobile action asset is configured for using said caller identification information to effect call back to said caller if communications with said caller are interrupted.

10. A system for communicating between a special number call answering agency and a mobile action asset as recited in claim 9 wherein said selected information includes caller location information; said mobile computer device being configured to display said caller location information.

11. A system for communicating between a special number call answering agency and a mobile action asset as recited in claim 5 wherein said selected information includes caller identification information; said mobile computer device being configured to display said caller identification information.

12. A system for communicating between a special number call answering agency and a mobile action asset as recited in claim 5 wherein said selected information includes map information indicating said caller location information; said mobile computer device being configured to display said map information.

13. A system for communicating between a public safety answering position and a mobile emergency action asset; said public safety answering position answering an emergency service call placed by a caller; said mobile emergency action asset participating in responding to said emergency service call; said public safety answering position and said mobile emergency action asset being configured to communicate wirelessly; said public safety answering position being configured to recognize and interpret emergency service information; said emergency service information including at least one of identification information and location information relating to said caller; the system comprising:

(a) an emergency service receiving terminal located with said mobile emergency action asset; said emergency service receiving terminal being configured to receive and display selected information of said emergency service information; said emergency service receiving terminal being configured to dial back said caller based upon said selected information; and (b) an emergency service call bridge; said emergency service call bridge being configured for actuation at said public safety answering position; said special number call bridge connecting said caller with said mobile emergency action asset and providing selected information of said emergency service information to said mobile emergency action asset when said emergency service call bridge is in an actuated orientation.

14. A system for communicating between a public safety answering position and a mobile emergency action asset as recited in claim 13 wherein said mobile emergency action asset includes a mobile computer device; said mobile computer device being wirelessly communicative with said public safety answering position.

15. A system for communicating between a public safety answering position and a mobile emergency action asset as recited in claim 13 wherein said selected information includes caller identification information, and wherein said mobile emergency action asset is configured for using said caller identification information to effect call back to said caller if communications with said caller are interrupted.

16. A system for communicating between a public safety answering position and a mobile emergency action asset as recited in claim 15 wherein said selected information includes caller location information; said mobile computer device being configured to display said caller location information.

17. A system for communicating between a public safety answering position and a mobile emergency action asset as recited in claim 15 wherein said selected information includes caller identification information; said mobile computer device being configured to display said caller identification information.

18. A system for communicating between a public safety answering position and a mobile emergency action asset as recited in claim 15 wherein said selected information includes map information indicating said caller location information; said mobile computer device being configured to display said map information.

19. A method for communicating between a special number call answering agency and a mobile action asset; said special number call answering agency answering a special number call placed by a caller; said mobile action asset participating in responding to said special number call; said mobile action asset including a mobile computer device; said special number call answering agency and said mobile computer device being configured to communicate wirelessly; said special number answering agency being configured to recognize and interpret special number information; said special number information including at least one of identification information and location information relating to said caller; the method comprising the steps of:

(a) In no particular order:
  (1) locating a special number receiving terminal with said mobile action asset; said special number receiving terminal being configured to receive and display selected information of said special number information; said special number receiving terminal being configured to dial back said caller based upon said selected information and
  (2) providing a special number call bridge; said special number call bridge being configured for actuation at said special number call answering agency;
(b) orienting said special number call bridge in an actuated orientation to connect said caller with said mobile action asset; and
(c) providing said selected information to said mobile action asset.

20. A method for communicating between a special number call answering agency and a mobile action asset as recited in claim 19 wherein the method comprises the further step of:

(d) displaying said selected information using said mobile computer device.

* * * * *